Jan. 10, 1956 P. F. SCOTT 2,730,214
FOOT PEDAL CONTROL MECHANISM FOR AUTOMOTIVE VEHICLES
Filed Oct. 15, 1953 3 Sheets-Sheet 1
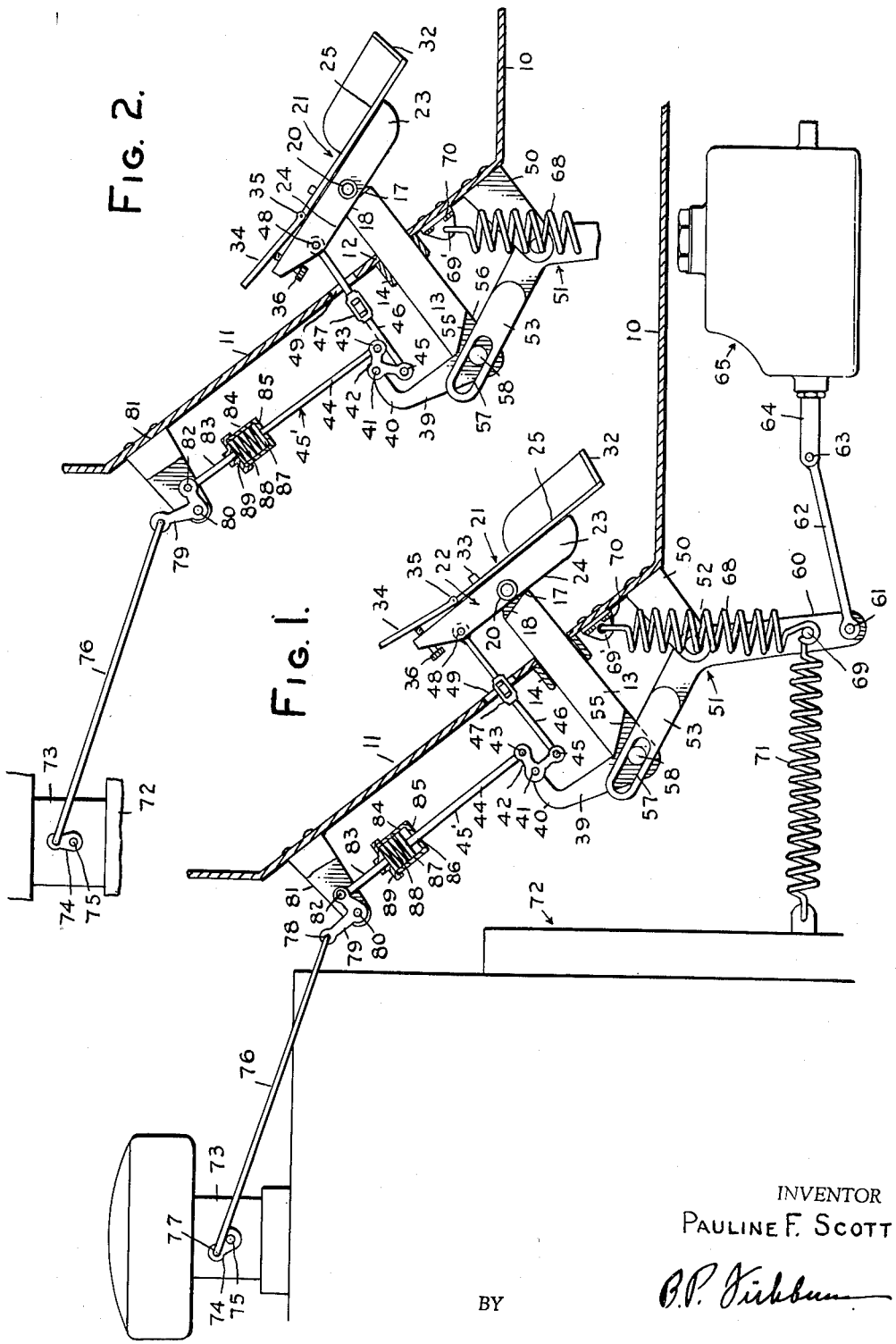
INVENTOR
PAULINE F. SCOTT
BY
ATTORNEY

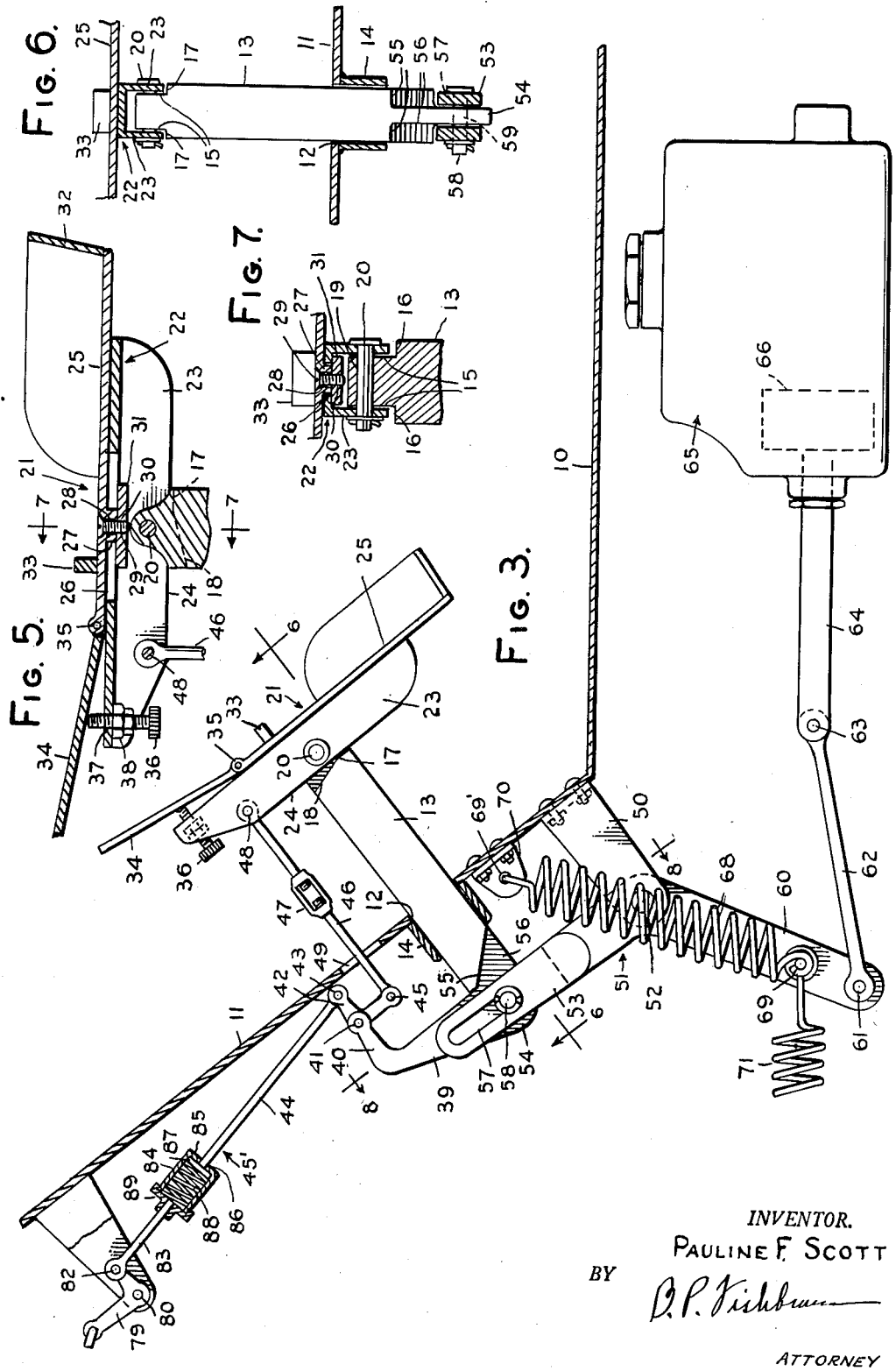

Jan. 10, 1956  P. F. SCOTT  2,730,214
FOOT PEDAL CONTROL MECHANISM FOR AUTOMOTIVE VEHICLES
Filed Oct. 15, 1953  3 Sheets-Sheet 3
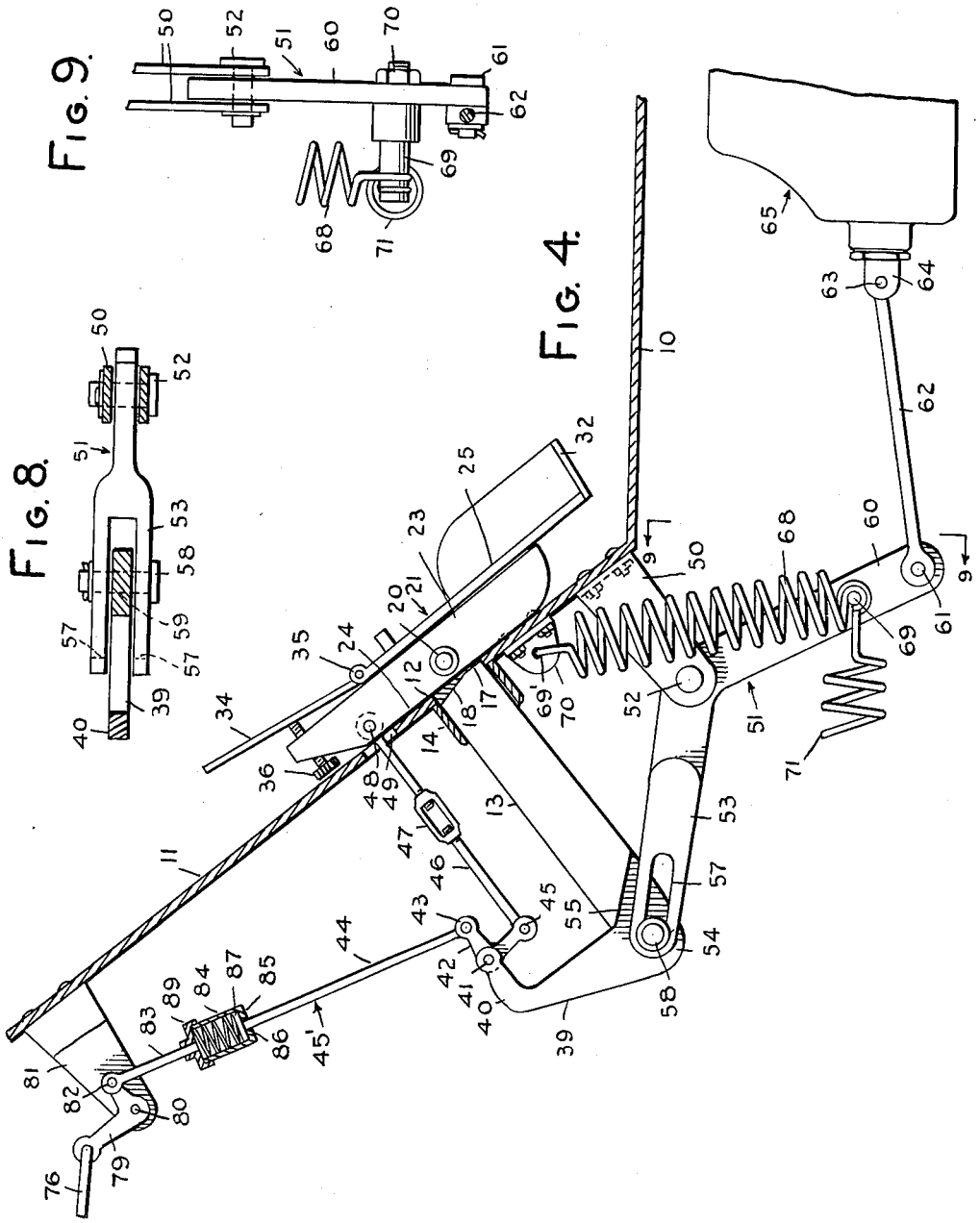
INVENTOR
PAULINE F. SCOTT
BY
ATTORNEY

United States Patent Office 2,730,214
Patented Jan. 10, 1956

2,730,214

FOOT PEDAL CONTROL MECHANISM FOR AUTOMOTIVE VEHICLES

Pauline F. Scott, Norcross, Ga.

Application October 15, 1953, Serial No. 386,246

1 Claim. (Cl. 192—3)

My invention relates to foot pedal control mechanism for automotive vehicles.

A primary object of the invention is to provide a combined foot brake and accelerator pedal for automotive vehicles, which will reduce driving effort and fatigue, and lessen the distance required to stop the vehicle in cases of emergency.

A further object is to provide mechanism of the above mentioned character which will be incapable of increasing engine speed or causing the vehicle to "run away," in case of complete brake failure, whereupon the foot pedal is completely depressed against the floor of the vehicle.

A further object of the invention is to provide a combined foot brake and accelerator pedal embodying means whereby the throttle may be opened somewhat while the pedal is normally depressed for braking the vehicle, thereby enabling the operator to start the vehicle on a hill or the like, without rolling backward.

A further object of the invention is to provide foot pedal control mechanism of the above mentioned character which is simplified and durable in construction, safe and efficient in operation and relatively inexpensive to manufacture.

Other objects and advantages of the invention will be apparent during the course of the following description.

In the accompanying drawings, forming a part of this application, and in which like numerals are employed to designate like parts throughout the same, Figure 1 is a side elevation of foot pedal control mechanism for automotive vehicles embodying the invention, parts in section, and showing the foot pedal depressed normally for applying the brakes of the vehicle and closing the throttle, Figure 2 is a similar side elevation of the mechanism, parts broken away, and showing the pedal adjusted to open the throttle somewhat when the brakes are about to be released, Figure 3 is a further side elevation of the mechanism on an enlarged scale, parts in section, showing the foot pedal fully elevated and the throttle closed, Figure 4 is a further fragmentary side elevation of the mechanism, similar to Figure 3, but showing the foot pedal fully depressed against the floor of the vehicle when the hydraulic brakes have failed, Figure 5 is an enlarged fragmentary central vertical section through the pedal and associated elements, Figure 6 is a cross sectional view taken on line 6—6 of Figure 3, Figure 7 is a transverse vertical section taken on line 7—7 of Figure 5, Figure 8 is a fragmentary cross sectional view taken on line 8—8 of Figure 3, and, Figure 9 is a fragmentary vertical cross section taken substantially on line 9—9 of Figure 4.

In the drawings, where for the purpose of illustration is shown a preferred embodiment of my invention, the numeral 10 designates the floor panel of an automotive vehicle, including the usual forward upwardly inclined portion 11 for the foot actuated controls of the vehicle.

In the present invention, the inclined floor portion 11 has an opening 12 formed therein, receiving a bar or shaft 13 for reciprocation. A guide sleeve 14 is rigidly secured to the bottom of the floor portion 11 in registration with the opening 12, and slidably receiving the bar 13, as shown. The bar 13 is preferably disposed at right angles to the inclined floor portion 11.

The upper end of the bar 13 is recessed upon opposite sides to provide parallel transverse faces 15 and lateral shoulders 16, Figure 7. As shown in the drawings, the shoulders 16 have rear relatively short portions 17, arranged at right angles to the longitudinal axis of the bar 13; and forward relatively long inclined portions 18, for purposes to be described. The reduced top extremity of the bar 13 has a transverse opening 19 extending therethrough, receiving a transverse pivot pin 20.

A foot pedal designated generally by the numeral 21 includes an enlongated inverted U-shaped channel member 22, as shown. Depending side flanges 23 of this channel member receive the top reduced extremity of the bar 13 between them, Figure 7, and extend downwardly over the flat faces 15 in close relation thereto. The flanges 23 are apertured near the longitudinal center of the channel member 22 for receiving the pivot pin 20, which serves to rockably secure the foot pedal 21 to the bar 13. The lower longitudinal edges 24 of the flanges 23 are disposed near and above the shoulder portions 17 and 18 for positive engagement therewith, when the foot pedal is rocked about the pin 20 in opposite directions.

A foot pedal plate or body portion 25, substantially wider than the channel 22 is mounted upon the channel, and extends for a major portion of the length thereof. The channel 22 is provided in its top and at its transverse center with a longitudinal slot 26, slidably receiving a rectangular block or key 27, preferably formed integral with the plate 25 and having an opening 28 formed therein. A screw 29 is received by an opening formed in the plate 25, at the transverse center of the same, and this screw extends through the opening 28 of the key, and has screw threaded engagement within a screw threaded opening 30 of a rectangular clamp plate 31, disposed beneath the top web of the channel 22 and between its side flanges 23, Figures 5 and 7. With this arrangement, the pedal plate 25 is adjustable longitudinally of the channel 22, throughout the length of slot 26. The pedal plate 25 may be rigidly held in selected adjusted positions by merely tightening the screw 29, which draws the clamp plate 31 upwardly into tight engagement with the top web of channel 22. The key 27 and clamp plate 31 cannot rotate with the screw 29, since they are rectangular.

The rear portion of the plate 25 carries an upstanding heel receiving wall or socket 32, rigidly secured thereto. Forwardly of the screw 29, an upstanding lug 33 is rigidly secured to the plate 25 for engagement with the heel, so that the foot of the operator cannot slide forwardly upon the pedal 21.

The pedal 21 further comprises a forward angularly adjustable pedal portion or plate 34 having its rear end hingedly secured at 35 to the forward end of the plate 25. The plate 34 is adapted to receive the portion of the foot ahead of the heel. The inclination of the plate 34 is adjustable by means of an adjusting screw 36, having screw threaded engagement within a screw threaded opening 37 formed in the top web of the channel 22, near its forward end and at its transverse center. The screw 36 is provided with a suitable lock nut 38 as shown.

A forward lateral extension or arm 39 is rigidly secured to the lower end of the bar 13, at right angles thereto, and preferably formed integral therewith. This arm 39 is disposed below the sleeve 24, as shown. The arm carries a forward upturned extension 40, integral therewith, pivotally connected at 41 to a right angle bell crank 42. The top of the bell crank 42 is pivotally connected at 43 to the rear section 44 of a throttle control rod assembly 45′ to be described in detail hereinafter. The control rod section 44 is disposed beneath the inclined floor portion 11, and extends forwardly and upwardly from the pivot 43, as shown. The rear end of the bell crank 42 is pivoted at 45 to a connecting rod 46, having an adjustable turnbuckle 47 connected therein, and having its upper end pivotally connected at 48 between the flanges 23 of channel 22, near the forward end of the latter. The connecting rod 46 is parallel to the bar 13, and is movable through a clearance opening 49 of the floor portion 11. The angle of the pedal 21 may be initially adjusted somewhat by means of the turnbuckle 47.

A depending bracket 50 is rigidly secured to the bottom of the inclined floor portion 11, somewhat rearwardly of the bar 13, and near the elevation of the floor portion 10. A large bell crank 51 is pivoted to the lower end of the bracket 50 by means of a pin 52, or the like. The bell crank 51 has a forward bifurcated arm 53 extending generally parallel with the inclined floor portion 11, and the bifurcated arm 53 receives the arm 39 between its sides, as well as a lower reduced portion 54 of the bar 13, which is recessed upon opposite sides to form diagonal shoulders 55, as shown. Flat parallel faces 56 are formed upon opposite sides of the reduced bar portion 54, which has the same width or thickness as the arm 39. The reduced portion 54 and arm 39 preferably have substantially a sliding fit between the sides of the bifurcated arm 53, as best shown in Figures 6 and 8. The opposite sides of the bifurcated arm 53 have longitudinal slots 57 formed therein, slidably receiving a transverse connecting pin 58, the pin extending through an opening 59 formed within the reduced bar portion 54, Figure 6. With this arrangement, the necessary lost motion between the pivoted bell crank 51 and reciprocatory bar 13 is provided for.

The bell crank 51 further includes a depending arm 60 extending below the bracket 50 and having its lower end pivotally secured at 61 to a connecting rod 62, in turn having its rear end pivoted at 63 to a reciprocatory horizontal plunger rod 64. A conventional hydraulic brake master cylinder 65, located beneath the horizontal floor portion 10 and secured in place by suitable conventional means, not shown, contains an operating plunger 66, secured to the plunger rod 64 for reciprocation therewith when the brakes of the vehicle are actuated by means of my control mechanism.

A strong retractile coil spring 68 is disposed near a side of the bell crank 51, and extends generally longitudinally of its arm 60. The lower end of the spring 68 is pivotally secured to a transverse pin 69, in turn rigidly secured at 70 to the arm 60, Figure 9. The upper end of the spring 68 is pivotally attached at 69′ to an apertured bracket 70, rigidly secured to the bottom of the inclined floor portion 11, just rearwardly of the bar 13.

A pedal return spring 71 is provided, and arranged substantially horizontally, and has its rear end secured to the pin 69 and its forward end secured in any suitable manner to a fixed part of the vehicle, such as the engine 72, Figure 1. The spring 71 works in opposition to the spring 68, and serves to return the pedal 21 to its fully elevated position shown in Figure 3. The springs 68 and 71 are preferably arranged generally at right angles, so that the return spring 71 need not resist the direct axial pull of the spring 68, but only the component of the force or pull of the spring 68 effective in a horizontal direction.

The engine 72, shown diagrammatically in Figure 1 of the drawings is equipped with a carburetor 73, having a fuel control lever 74 pivoted to the carburetor at 75. A connecting rod or link 76 has its forward end pivotally secured at 77 to the level 74, and its rear end pivotally connected at 78 to a bell crank 79. The bell crank 79 in turn is pivoted at 80 to a depending bracket 81, rigidly secured to the bottom of the inclined floor portion 11, near the top of such portion. The rear arm of the bell crank 79 is pivoted at 82 to a forward section 83 of the control rod assembly 45′.

The control rod assembly 45′ includes the forward and rear rod sections 83 and 44, as shown. A lost motion device is connected in the control rod assembly 45′, and comprises a cylindrical casing or shell 84, bodily carried by and rigidly secured to the rod section 83. The rear end 85 of the casing 84 has an opening 86, slidably receiving the rod section 44, as shown. The forward end of the rod section 44 is provided with a head 87, rigidly secured thereto, and disposed within the bore of the casing 84 for reciprocation therein. The head 87 cannot pass through the opening 86 and is consequently held captive between the ends of the cylindrical casing 84. A compressible coil spring 88 is disposed within the casing 84, and has its ends engaging the head 87 and forward end 89 of the casing respectively. The spring 88 tends to urge the casing 84 and rod section 83 axially or longitudinally forwardly of the rod section 44, and consequently tends to urge the bell crank 79 and carburetor lever 74 in a counterclockwise direction, Figure 1, relative to the rod section 4. When the fuel control lever 74 is in the position shown in Figure 1, the throttle is fully closed, and the fuel to the engine is cut off. As the lever 74 turns in a clockwise direction from its position of Figure 1, the throttle is gradually opened, and fuel is admitted to the engine.

The operation of my foot pedal control mechanism is as follows:

The necessary preliminary adjustments of the turnbuckle 47, set screw 36 and clamping screw 39 are made to suit the comfort of the operator and to bring all operating components to their proper working positions. The foot of the operator is placed upon the pedal 21, with the heel positioned at the rear end of the plate 25, and the forward part of the foot resting upon the plate 34. When it is desired to apply the brakes of the vehicle, the pedal 21 is depressed with the heel of the foot, and the lower edges 24 of the flanges 23 are brought into engagement with the shoulders 17, and the entire pedal and bar 13 are forced downwardly through the guide sleeve 14 to a position such as that shown in Figure 1.

When this occurs, the bell crank 51 turns counterclockwise upon the pivot pin 52, and the plunger 66 of master cylinder 65 is shifted rearwardly to apply the hydraulic brakes of the vehicle. At this time, the spring 68 swings about its upper end 69′ to a position rearwardly of dead center with respect to the pivot pin 52, as shown in Figure 1. The spring 68 now assists the operator in applying the brakes, and tends to turn the bell crank 51 counterclockwise, so that less effort is required to hold the foot pedal 21 depressed.

When the foot pedal is released by the operator, the return spring 71 overcomes the effect of the spring 68, and readily returns the pedal 21 to its fully elevated position of Figure 3. At this time, the spring 68 swings or pivots about its upper end 69′ to a position somewhat forwardly of dead center through the pivot pin 52, and serves to hold the pedal 21 elevated.

While the pedal 21 is fully elevated, Figure 3, and the brakes are not applied, the operator may open the throttle by means of the control lever 74, and associated elements at will. This is done by pressing the forward part of the foot against the plate 34 and pivoting the pedal 21 about the pin 20, until the lower edges 24 contact the inclined shoulders 18 of bar 13, or until the pedal assumes a desired intermediate position between that shown in Figure 3, and its point of contact with the shoulders 18. When this occurs, the connecting rod 46 moves downwardly, and the bell crank 42 turns clockwise about the pivot pin 41. As shown in Figure 3, when the pedal 21 is fully elevated, there is no lost motion within the control rod assembly 45′, and the head 87 of rod section 44 is in engagement with the rear end 85 of casing 84. This means that clockwise movement of the bell crank 42 will cause the control rod assembly 45' to shift rearwardly and turn the bell crank 79 and fuel control lever 74 in the clockwise direction, for admitting fuel to the engine. It is thus apparent that the engine will speed up whenever the pedal portion 34 is depressed for pivoting the pedal 21 in a counterclockwise direction upon the pin 20, while the bar 13 and pedal 21 are fully elevated, Figure 3.

When the pedal 21 is depressed, Figure 1, for applying the brakes, it may be seen that the effective length of the control rod assembly 45' is lessened somewhat, and the head 87 moves forwardly within the casing 84 and compresses the spring 88. This causes the control rod section 83, under the influence of spring 88 to urge the bell crank 79 and fuel control lever 74 in a counterclockwise direction, to shut off the flow of fuel to the engine. This is desirable when the brakes are applied, and it would be undesirable at this time to speed up the engine.

Assuming however, that the vehicle has been brought to a stop on an incline, and it is desired to start up the same without rolling backward, the operator while holding the pedal 21 depressed, Figure 1, may press upon the toe plate 34, simultaneously with starting to elevate the foot pedal 21. When this is done, the bell crank 42 will be turned clockwise, and the control rod section 44 will shift rearwardly until the lost motion between the head 87 and casing end 85 is taken up. During this movement, the fuel control lever 74 remains in the closed position, Figure 1, and does not begin to turn clockwise for admitting fuel to the engine, until after the head 88 engages the casing end 85, and establishes a rigid connection between the bell cranks 42 and 79. When this happens, further depression of the toe plate 34 will turn the fuel control lever 74 clockwise, Figure 1, sufficiently to speed up the engine so that the vehicle may start up the incline, without rolling backwards, as the foot pedal 21 is elevated from its position of Figure 1 to its position of Figure 3. As the foot pedal approaches its fully elevated position of Figure 3, the operator will be able to open the throttle to an ever increasing extent, by depressing the toe plate 34. If the toe plate is actually held in one position, as the foot pedal 21 is elevated from its position of Figure 1 to that of Figure 3, the throttle will be gradually opened automatically by turning the control lever 74 clockwise. In other words, if the toe plate 34, Figure 1, is depressed sufficiently to shift the head 78 into contact with the casing end 85, just as the pedal 21 begins to elevate, the subsequent raising of the foot pedal will automatically turn the control lever 74 clockwise and gradually open the throttle, as the foot pedal 21 is elevated.

In the event that the hydraulic brakes fail completely, due to lack of hydraulic fluid, or otherwise, the foot pedal 21 in an emergency stop will travel all the way to the inclined floor portion 11 and engage the same, as illustrated in Figure 4. If this should take place, it is of course undesirable to have the engine speed up, as this would increase the hazard. In Figure 4, it is evident that the operator cannot effect an opening of the throttle, while the foot pedal 21 is in contact with the floor portion 11, since it is impossible for the pedal to pivot in a counterclockwise direction about the pin 20, due to contact with the floor portion 11. It is to be noted that the bell crank 79, Figure 4, is positioned as in Figures 1 and 3, to maintain the fuel control lever 74 in the fully closed position when the brakes have failed, even though there may be no lost motion in the control rod assembly 45' at this time. Since the pedal 21 can be depressed no further than the floor portion 11, Figure 4, and cannot pivot upon the pin 20, it is impossible for the operator or pedal to effect clockwise movement of the bell crank 79, and thereby open the throttle. If desired, some degree of lost motion may still be provided in the control rod assembly 45', while the pedal 21 is fully depressed, Figure 4, but this is unnecessary, so long as the lost motion is just taken up completely at the time that the foot pedal 21 engages the floor portion 11, and this is the condition illustrated in Figure 4.

It is thus seen that my mechanism provides means for the operator of the vehicle to control the brakes and throttle with one foot. The brakes are applied with the heel of the foot, and the throttle is adjusted with the toe of the foot. When the vehicle has been brought to rest on a hill, the throttle may be opened somewhat, simultaneously with the start of elevation of the foot pedal 21, so that the vehicle will not roll backward. When the brakes fail, and the foot pedal 21 engages the floor portion 11, the throttle remains closed, and cannot be opened by the operator even in the panic caused by the emergency. Whenever the brakes are applied with the heel of the foot, Figure 1, the throttle will automatically close and be held closed, and whenever the foot pedal 21 is again elevated to release the brakes, while the toe plate 34 is held depressed somewhat, the throttle will be gradually and automatically opened.

It is to be understood that the form of my invention herewith shown and described is to be taken as a preferred example of the same, and that various changes in the shape, size and arrangement of parts may be resorted to, without departing from the spirit of the invention or scope of the subjoined claims.

Having thus described my invention, I claim:

A foot operated control mechanism for automotive vehicles, comprising an inclined stationary support, an inclined bar, means to mount the inclined bar upon the support so that the inclined bar reciprocates longitudinally in a straight line at substantially right angles to the inclined support, a foot pedal arranged above the inclined support, a flange arranged beneath and secured to the foot pedal and extending throughout the major portion of the length of the foot pedal and pivotally mounted upon said bar, said bar having a shoulder to engage the flange and thereby holding the foot pedal at substantially right angles to said bar, said bar having an inclined shoulder leading to the first shoulder to permit the toe end of the pedal being inclined downwardly with respect to the bar, said bar being movable downwardly sufficiently upon break failure to cause the flange to engage the inclined support for preventing the turning movement of the pedal upon said pivot, a substantially horizontal arm rigidly secured to the bar near its lower end and extending forwardly beyond the same, a bell crank pivoted upon the horizontal arm, a link connecting the bell crank and foot pedal upon the forward side of said bar, throttle control means connected with the bell crank including a lost-motion element connected therein, a substantially vertical swinging brake-actuating bell crank arranged beneath the stationary support and pivotally mounted upon the stationary support upon the side of said bar remote from the first-named bell crank, a pin and slot connection between the brake-actuating bell crank and the lower end of said bar, fluid pressure brake control means connected with the brake-actuating bell crank, a retractable coil spring connected with the stationary support above the pivot of the brake-actuating bell crank lever and in substantial vertical alignment with such pivot and connected with the brake-actuating bell crank at a point below said point, the point of connection between the spring and brake-actuating bell crank being shiftable upon opposite sides of the pivot and the brake-actuating bell crank for moving said spring past dead center with respect to the pivot of the brake-actuating bell crank when such brake-actuating bell crank is swung in opposite directions, and a generally horizontal retractile coil spring connected with the brake-actuating bell crank beneath its pivot to swing such bell crank in a direction to raise said bar.

References Cited in the file of this patent

UNITED STATES PATENTS

| | | |
|---|---|---|
| 1,232,793 | Grimes | July 10, 1917 |
| 1,473,754 | Baihle | Nov. 13, 1923 |
| 1,473,984 | Baihle | Nov. 13, 1923 |
| 2,258,627 | Siesennop | Oct. 14, 1941 |
| 2,586,111 | St. Maurice | Feb. 19, 1952 |